United States Patent
Barton, Jr. et al.

[15] 3,634,991
[45] Jan. 18, 1972

[54] MOLDING RETAINER

[72] Inventors: James F. Barton, Jr.; William G. Crary, both of Utica, Mich.

[73] Assignee: General Motors Corporation, Detroit, Mich.

[22] Filed: Nov. 13, 1969

[21] Appl. No.: 876,403

[52] U.S. Cl. .................................. 52/718, 52/403, 24/73
[51] Int. Cl. ............................ F04f 19/02, A44b 21/00
[58] Field of Search .......................... 52/716–718, 290, 52/242, 403; 24/73 PM, 73 HS, 201 C

[56] References Cited

UNITED STATES PATENTS

| | | | |
|---|---|---|---|
| 2,858,591 | 11/1958 | Frey | 24/201 C |
| 3,127,965 | 4/1964 | Weisenberger | 24/73 HS |
| 3,130,822 | 4/1964 | Meyer | 24/73 HS |
| 3,197,935 | 8/1965 | Clancy et al. | 52/718 |

FOREIGN PATENTS OR APPLICATIONS

| | | | |
|---|---|---|---|
| 1,252,603 | 12/1960 | France | 52/403 |

Primary Examiner—Frank L. Abbott
Assistant Examiner—James L. Ridgill, Jr.
Attorney—Jean L. Carpenter and Arthur N. Krein

[57] ABSTRACT

A retainer for securing molding, such as a window garnish molding or side body trim molding to an apertured support panel of a vehicle body, the retainer including a pair of integrally hinged members adapted to engage the inner curved edges of a channel-shaped molding and a lateral tongue having a hook portion adapted to be inserted through an opening in the body and an adjacent portion which bears against the body.

5 Claims, 9 Drawing Figures

PATENTED JAN 18 1972

INVENTORS
James F. Barton, Jr., &
BY William G. Crary

Arthur N. Krein
ATTORNEY

INVENTORS
James F. Barton, Jr., &
BY William G. Crary

Arthur N. Krein
ATTORNEY

MOLDING RETAINER

This invention relates to a molding retainer and, more particularly, to a retainer for securing a molding to an apertured panel of a vehicle body or similar device.

Conventionally, moldings, such as window garnish moldings, have been fastened to a vehicle body either by retainers which are fastened to a panel of the vehicle body by screws or by retainers that snap into apertured openings in the panel. These methods of retaining the molding require a great deal of assembly time since the retainers in both of these methods are first fastened to the supporting panel after which the molding is latched into place on the retainer.

It is, therefore, a primary object of this invention to improve molding retainers whereby the retainers can be preassembled with the moldings to be retained and then simply and effectively secured to an apertured support panel without the aid of any special tools.

Another object of this invention is to provide a relatively simple retainer structure for fastening a molding to an apertured support panel.

These and other objects of the invention are attained by means of a plastic molding retainer having a pair of hinge members integrally hinged to each other along a common hinge line to provide an overcenter snap feature. A lateral tongue extends from this structure and is provided with hook portions insertable into the apertures in the support panel.

For a better understanding of the invention, as well as other objects and further features thereof, reference is had to the following detailed description of the invention to be read in connection with the accompanying drawings, wherein.

Figure 1:
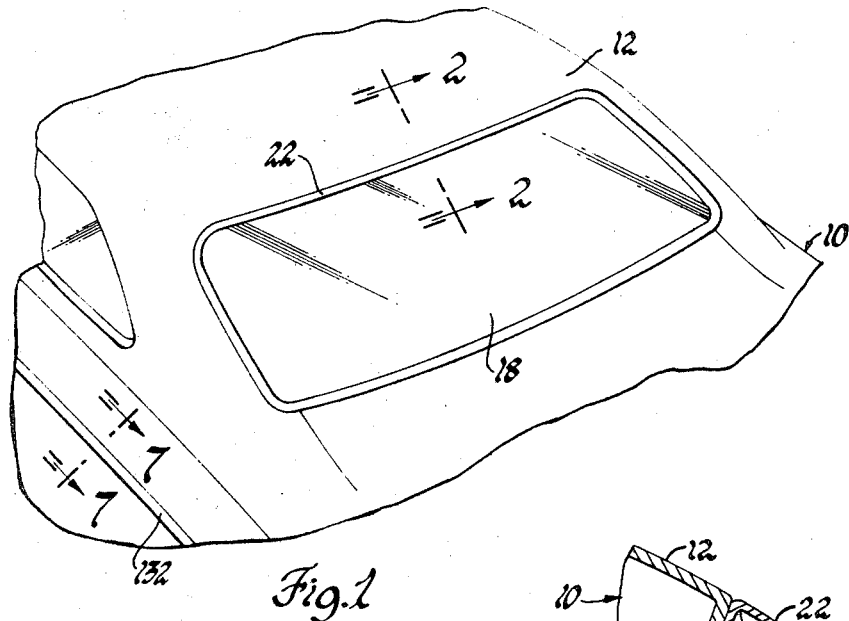
FIG. 1 is a partial rear perspective view of a vehicle body having the rear window garnish molding thereof secured to the rear window header by a retainer assembly according to this invention and also having a side body trim molding secured to the body of a retainer assembly according to this invention.
Figure 2:
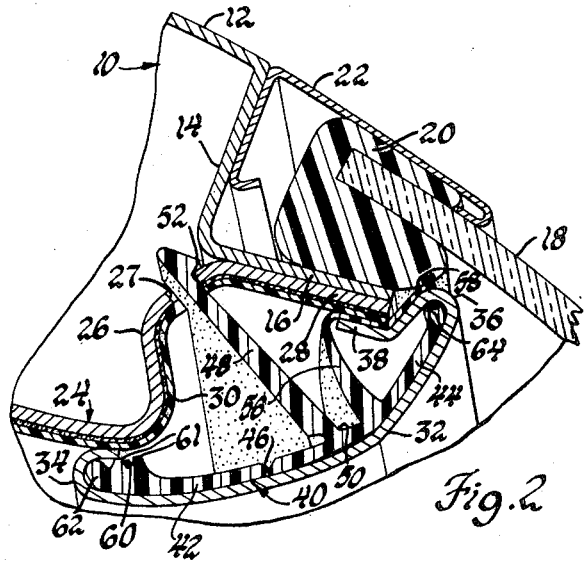
FIG. 2 is an enlarged sectional view taken along the line 2—2 of FIG. 1.
Figure 3:
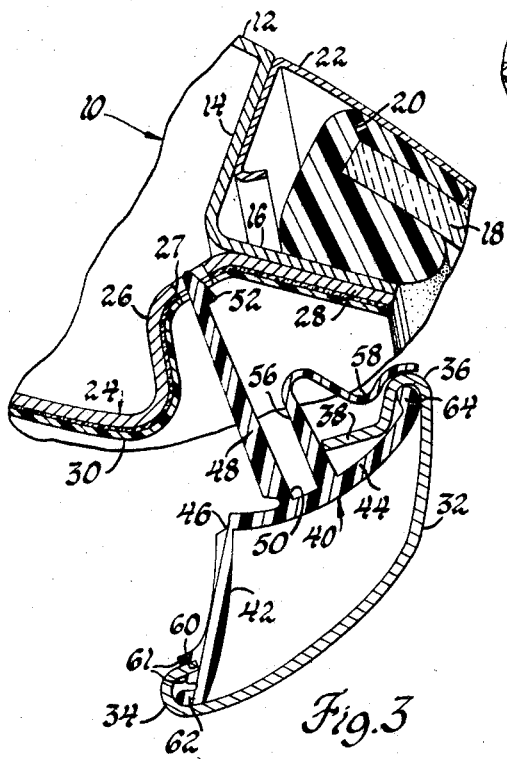
FIG. 3 is a view similar to FIG. 2 showing the retainer and molding in position prior to installation.

Referring now to the drawings, a vehicle body, generally designated 10, includes the roof panel 12. As shown in FIGS. 2 and 3, the rear edge portion of the roof panel 12 terminates in a depending lateral flange 14 and flange extension 16 to form part of a window well which receives rear window 18 retained in position by adhesive 20, as is well known in the art. A decorative molding 22 secured in a suitable manner covers the edge portion of the rear window 18 and adhesive 20. The body or rear window header panel 24 includes a recurve flange 26 and terminal flange 28, the latter being welded to flange 16 to provide a body pinch weld. As shown in FIGS. 2 and 3, the recurve flange 26 is provided with spaced apart apertures 27, for a purpose to be described.

As is conventional, the inner surface of the roof panel 12 is concealed by a headlining 30 which extends from the front window or windshield header, not shown, to the header panel 24 and is supported between these headers by conventional listing wires, not shown. When the headlining is mounted on the body, the front edge portion thereof is secured to the windshield header, the intermediate portion is secured to the listing wires, and then the headlining is pulled taut toward the rear of the body. As shown in FIGS. 2 and 3, the rear edge portion of the headlining covers the header 24 and at least a portion of the recurve flange 26 and can extend rearward to also cover a portion of terminal flange 28. If this occurs, suitable openings are then formed in the headlining in alignment with apertures 27, the rear edge portion of the headlining being cemented to the header 24 and to the recurve flange 26 thereof.

It is thereafter covered by a molding 32 held in position by a retainer 40 in accordance with this invention. The molding 32 of a suitable length is of generally arcuate cross section opening to the curved flanged end of header 24 and, includes return bent flanges 34 and 36 at the edge portions thereof. In the specific embodiment shown in FIGS. 2, 3 and 4, a lateral flange 38 extends from the return bent flanges 36 to align the molding against the terminal flange 28 of header 24.

Figure 4:
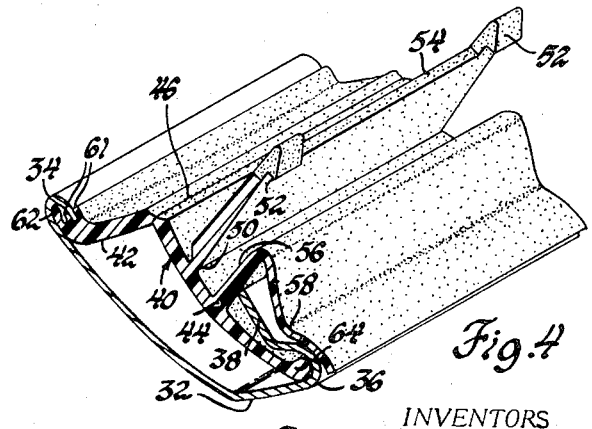
FIG. 4 is a perspective view of a portion of the retainer and molding assembly of FIG. 3.

The retainer 40, made of a suitable flexible material, for example, of polypropylene plastic material, includes hinge members 42 and 44 which are integrally hinged to each other along a groove or hinge line 46 and in their free state are in a partially folded position in relation to each other as shown in FIGS. 3 and 4. A lateral extension or tongue 48 is integrally hinged at 50 to hinge member 44 and terminates in spaced apart single barb hook portions 52 with an intermediate edge or headed extension 56 terminating in an antisqueak lip 58 having a contour formed complementary to the contour of the lateral flange 38 and return bent flange 36 of molding 30 may be provided integrally with the hinge member 44, as shown. Hinge member 42 may also be provided with an integrally recessed groove portion 60 near its free end to provide fingers 61 adapted to receive the end edge of bent flange 34 for a purpose to be described.

As can be seen in FIGS. 3 and 4, the hinge members 42 and 44, when in the free state, are normally located in a partially folded position to one side of the retainer with the extent between the ends 62 and 64 of the hinge members 42 and 55, respectively, being generally equal to the extent between flanges 34 and 36 of molding 32 so that the retainer can be slipped between these flanges and into the concavity of the molding 32 with very little or no additional folding of the hinge members about hinge line 46. Since the retainer is preassembled with the molding prior to assembly and since it may sometimes be preassembled and then shipped to an assembly location, the recessed groove 60 is provided to receive the edge of bent flange 34 between fingers 61 to further insure retention of the retainer 40 in molding 32 during shipment and before final assembly.

In the assembly of the retainer and molding to the header panel 24, the hook portions 52 of the retainer are inserted through apertures 27 until the header panel engaging edge 54 contacts the header of the headlining sandwiched therebetween. Thereafter, pressure is applied against the molding which is resisted by lateral tongue 48 acting against the hinge member 44 to cause it and hinge member 42 to unfold relative to each other about hinge line 46 and then partially fold to the other side or overcenter as the ends 62 and 64 thereof move within the bent flanges 34 and 36, respectively. As this occurs, the edge of flange 34 is forced out of groove 60 in hinge member 42. At the same time, the antisqueak lip 58 is moved into alignment against lateral flange 38 and flange 36. The hinge line 46 portion of the retainer moves into engagement with the inner surface of the molding and, the normal bias of the hinge members in their now overcenter relation with respect to the hinge line force the ends 62 and 64 thereof against the inner surfaces of flanges 34 and 36 to securely retain the molding on the retainer. The retainer is secured to the header panel 24 by the barbs of hook portions 52 engaging the back or topside of the recurve flange 26, the tongue 48 pivoting counterclockwise slightly with respect to hinge member 44 to the position shown in FIG. 2 to assist in locking the barbs of hook portions 52 to the header panel, while the overcenter action of the hinge members will now bias the barbs tightly against the back side of the header panel.

Figure 5:
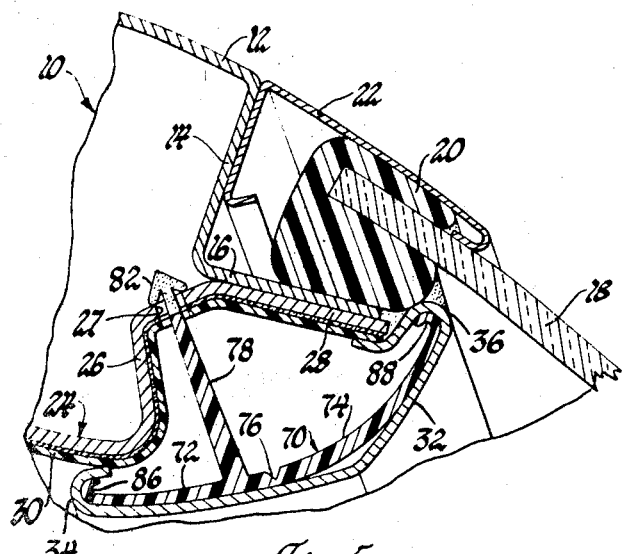
FIG. 5 is a view similar to FIG. 2 illustrating a second embodiment of the retainer of the invention.
Figure 6:
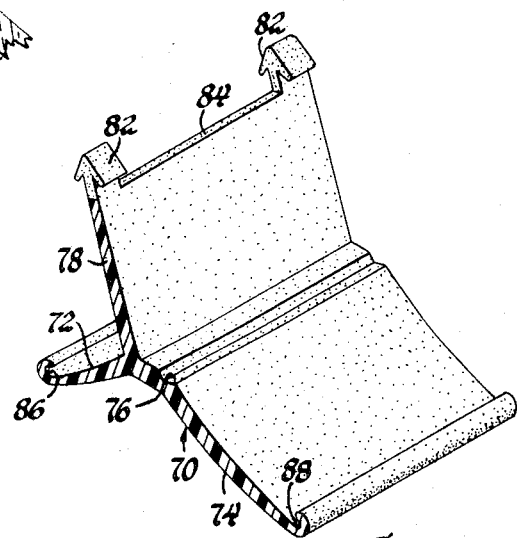
FIG. 6 is a perspective view of a portion of the retainer of FIG. 5.

Referring now to FIGS 5 and 6, wherein like reference numerals indicate like parts, another embodiment of a retainer in accordance with the invention is illustrated. In this embodiment, the retainer, generally designated 70, includes hinge members 72 and 74 which are integrally hinged to each other along a groove or hinge line 76 and in the free state are positioned in partially folded relation to each other, as shown in FIG. 6. A lateral tongue 78 extends from hinge member 72 and terminates in spaced apart double barb hook portions 82 with a header panel engaging edge 84 therebetween. Retainer 70 is preassembled to the molding 34 by engagement of the ends 86 and 88 of hinge members 72 and 74, respectively, with the bent flanges 34 and 36 respectively. In the assembly of this retainer and molding to the header, the hooked heads 82 are forced through apertures 27, partially forcing the bark end of these hooks together until they are extended through the apertures at which they will snap back to their normal position to engage the backside of flange 26 of the header panel. Thereafter, further assembly of the retainer and molding is the same as previously described in regard to retainer 40.

Figure 7:
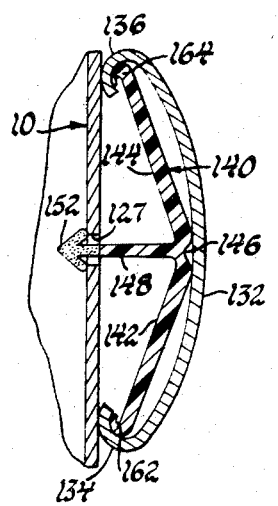
FIG. 7 is a sectional view taken along line 7—7 of FIG. 1 illustrating another embodiment of a retainer for side body trim molding.
Figure 8:
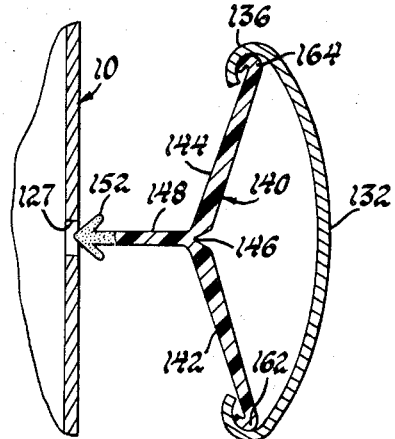
FIG. 8 is a view similar to FIG. 7, but with the retainer and molding in position prior to installation; and, FIG. 9 is a perspective view of a retainer illustrated in FIGS. 7 and 8.
Figure 9:
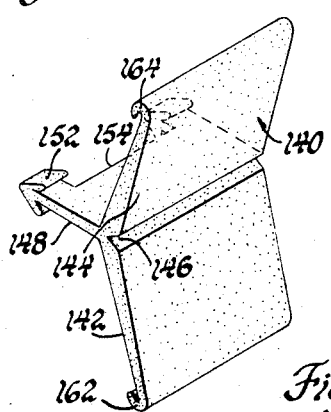

In FIGS. 7, 8 and 9, there is illustrated another embodiment of a retainer used in connection with a side body trim molding 132 secured to the retainer 140 to the side of body 10, which has been provided with spaced apertures 27 therein.

Side body trim molding 132 is of generally arcuate cross section opening to body panel and includes return bent flanges 134 and 136 at the edge portions thereof. Retainer 140 includes hinge members 142 and 144 of approximately the same size integrally hinged to each other along a groove or hinge line 146. A lateral tongue 148 is integrally connected to the hinge members along hinge line 146 and terminates in spaced apart double barb hook portions 152 with intermediate body engaging edge 154 therebetween. As shown in FIGS. 8 and 9, the hinge member 142 and 144, when in their free state, are located in a partially folded position, and with tongue 148 form a substantially Y-shaped structure, the extent between ends 162 and 164 of hinge members 142 and 144, respectively, being generally equal to he extent between flanges 134 and 136 of side body trim molding 132 so that this retainer can be slipped between these flanges with very little or no additional folding of the hinge members about hinge line 146. As the molding and retainer are then pressed against the body, the prongs on the hooked ends 152 go through the apertures 127 in the body and then pressure against the tongue 148, as the intermediate body engaging edge 154 contacts body 10, snaps the hinge members overcenter of hinge line 146 to pull the molding against the body 10, as shown in FIG. 7.

Although not shown, it is obvious that retainers 70 and 140 can also be provided with an antisqueak lip on either of their hinge members similar to that shown on retainer 40. In addition, it is also obvious that a plurality of retainers constructed in accordance with the invention may be used to secure the moldings in place or, if desired, the retainer of the invention can be made as a single continuous retainer strip of a length corresponding to the length of the molding to be retained. If a plurality of retainer sections are used, it is preferable that each retainer section include at least a pair of hooks with an intermediate body engaging edge, as illustrated in FIGS. 4, 6 and 9, or alternatively, a central located single hook with body engaging edges on opposite sides thereof.

What is claimed is:

1. A molding and retainer combination for an aperture support panel comprising an elongated transversely arcuate molding having return bent edge portions, an elongated retainer of plastic material including a hinge member having a first member and a second member integrally hinged together about a common hinge line, a tongue integral with and extending laterally from said hinge member, spaced apart hook portions on said tongue as its free end adapted to be inserted into apertures in said support panel, an edge on said tongue between spaced apart hook portions adapted to engage said panel when said hook portions are inserted into the apertures in said panel, the engagement of said edge means with said panel indicating that said hook means are in said apertures and applying pressure to said retainer actuating said hinge member from its partially folded position away from said tongue to a partially folded position toward said tongue engaging said hinge members with said arcuate molding return bent edge portions.

2. A retainer according to claim 1 wherein said tongue is integral with and hinged to said second member of said hinge member.

3. A retainer according to claim 2 further including an integral lateral extension means on said hinge member adjacent to said tongue, said lateral extension means including an antirattle lip means adapted to engage the outer surface of a return bent edge portion of the molding.

4. A retainer according to claim 2 wherein said first member has a slot adjacent to a free edge thereof providing spaced fingers adapted to engage opposite sides or a return bent edge portion of the molding when said hinge member is in said free state.

5. A retainer according to claim 1 wherein said tongue is integral with both said first member and said second member of said hinge member along said common hinge line.

* * * * *